Figure 1:
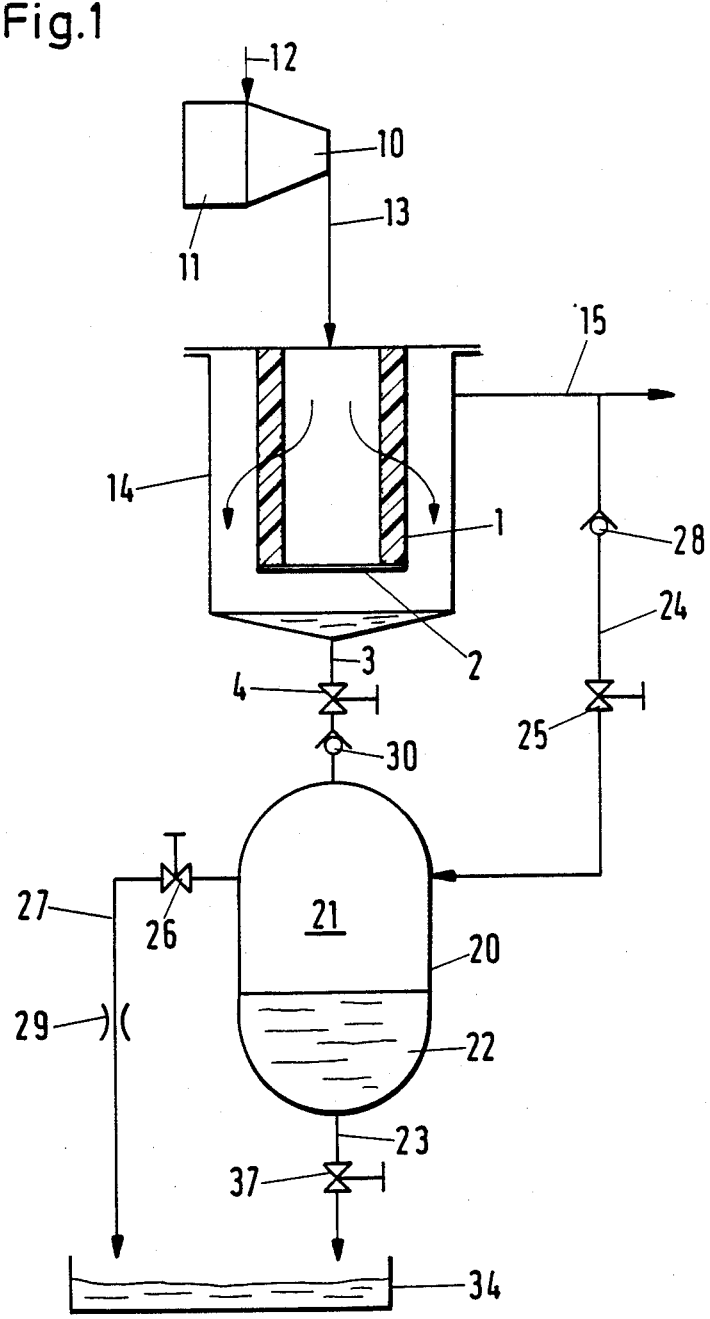

United States Patent [19]

Muller

[11] Patent Number: 4,878,923
[45] Date of Patent: Nov. 7, 1989

[54] APPARATUS FOR REMOVING OIL FROM A COMPRESSED GAS FLOW

[75] Inventor: Eduard Muller, Ettenhausen, Switzerland

[73] Assignee: Maschinenfabrik Sulzer-Burckhardt AG, Winterthur, Switzerland

[21] Appl. No.: 301,626

[22] Filed: Jan. 25, 1989

[30] Foreign Application Priority Data

Feb. 25, 1988 [CH] Switzerland ............ 00707/88

[51] Int. Cl.⁴ .......................................... B01D 46/00
[52] U.S. Cl. ...................................... 55/185; 55/218; 55/466; 55/350
[58] Field of Search ............... 55/185, 218, 219, 429, 55/430, 169, 420, 466, 350

[56] References Cited

U.S. PATENT DOCUMENTS

| 767,709 | 8/1904 | Osbourn | 55/219 |
| 3,890,122 | 6/1975 | Frantz | 55/420 |
| 4,070,166 | 1/1978 | Emanuelsson | 55/185 |

FOREIGN PATENT DOCUMENTS 2658310  7/1977  Fed. Rep. of Germany .

Primary Examiner—Bernard Nozick
Attorney, Agent, or Firm—Kenyon & Kenyon

[57] ABSTRACT

The apparatus for removing oil from a compressed gas flow includes a separator in which the oil is removed and initially collected as well as a vessel for receiving the collected oil from time-to-time. The vessel is disposed below the separator and communicates therewith by way of connecting lines employing shutoff valves. The vessel serves to collect the oil over time and permits a discharge of oil therefrom while completely separated from the separator.

6 Claims, 3 Drawing Sheets

APPARATUS FOR REMOVING OIL FROM A COMPRESSED GAS FLOW

This invention relates to an apparatus for removing oil from a compressed gas flow.

Heretofore, it has been known to use various techniques for removing oil from a compressed gas flow. For example, use has been made of at least one separator which is connected by way of an inlet and an outlet to a line conveying a compressed gas flow and in which oil is separated from the gas and removed through a shutoff oil discharge.

In known systems of this kind, the oil which is separated from the gas flow is discharged either periodically by opening the shutoff oil discharge or continuously by a level control. However, when the oil discharge opens, the oil pressure is reduced directly to ambient pressure. Consequently, the oil is discharged more or less violently depending upon the difference between ambient pressure and the gas pressure in the separator. The opening of the oil discharge therefore causes a disturbance on the gas side, with the result that while the oil is discharging some of the oil is eddied and converted into an aerosol and returned in this form to the cleaned gas. However, this is precisely what the separator is intended to obviate and is unsatisfactory in cases where there are stringent requirements as to the cleanliness of the gas.

It has also been known to employ a technique as described in German O.S. No. 2658310 for removing oil from a compressed gas flow. However, this requires a rather cumbersome structure in order to isolate the separated oil from the cleaned gas flow.

Accordingly, it is an object of the invention to provide a simplified structure for separating oil from a compressed gas flow.

It is another object of the invention to prevent separated oil from returning to a flow of cleaned gas.

Briefly, the invention provides an apparatus for removing oil from a compressed gas flow which comprises at least one separator and a vessel below the separator.

The separator is constructed to have an inlet to receive a flow of compressed gas, means for separating oil from the compressed gas flow, a gas outlet for expelling a flow of gas and an oil outlet for expelling a flow of separated oil.

The vessel below the separator is constructed to have an oil inlet which is selectively connected to the oil outlet of the separator in order to receive a flow of oil. In addition, the vessel has a gas inlet selectively connected to the gas outlet of the separator, a gas outlet for expelling gas and a restrictor connected to the gas outlet. Still further, the vessel has an oil outlet for selectively discharging oil therefrom.

The apparatus is constructed to have a connecting line between the oil outlet of the separator and the oil inlet of the vessel. In addition, a shut off valve is disposed in the line to permit oil to be transferred from the separator to the vessel from time-to-time. A check valve is also placed in the line to prevent a back-flow from the vessel to the separator.

A connection line is also provided between the gas outlet of the separator and the gas inlet of the vessel. This line also contains a shut-off valve as well as a check valve to prevent a back-flow of gas from the vessel to the separator.

The apparatus is such that a relatively reduced pressure difference can be maintained between the separator and the vessel. Thus, during discharge of oil from the separator to the vessel, the pressure differential does not eddy the oil sufficiently to form an aerosol. The cleaned gas within the separator thus remains clean.

Further, when oil is discharging from the separator, the shut-off valve in the line connecting the gas outlet of the separator to the gas inlet of the vessel may be closed. This ensures that no oil in aerosol form can return to the cleaned compressed gas in the separator.

Figure 2:
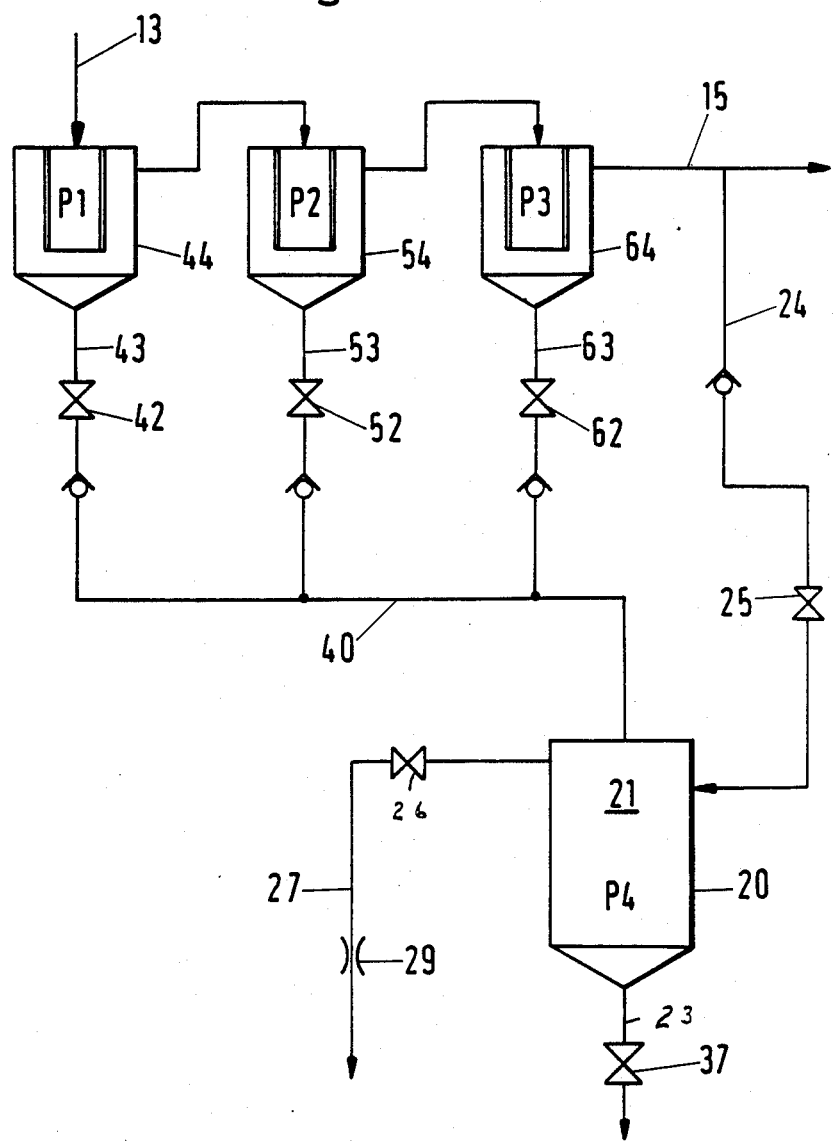
Figure 3:
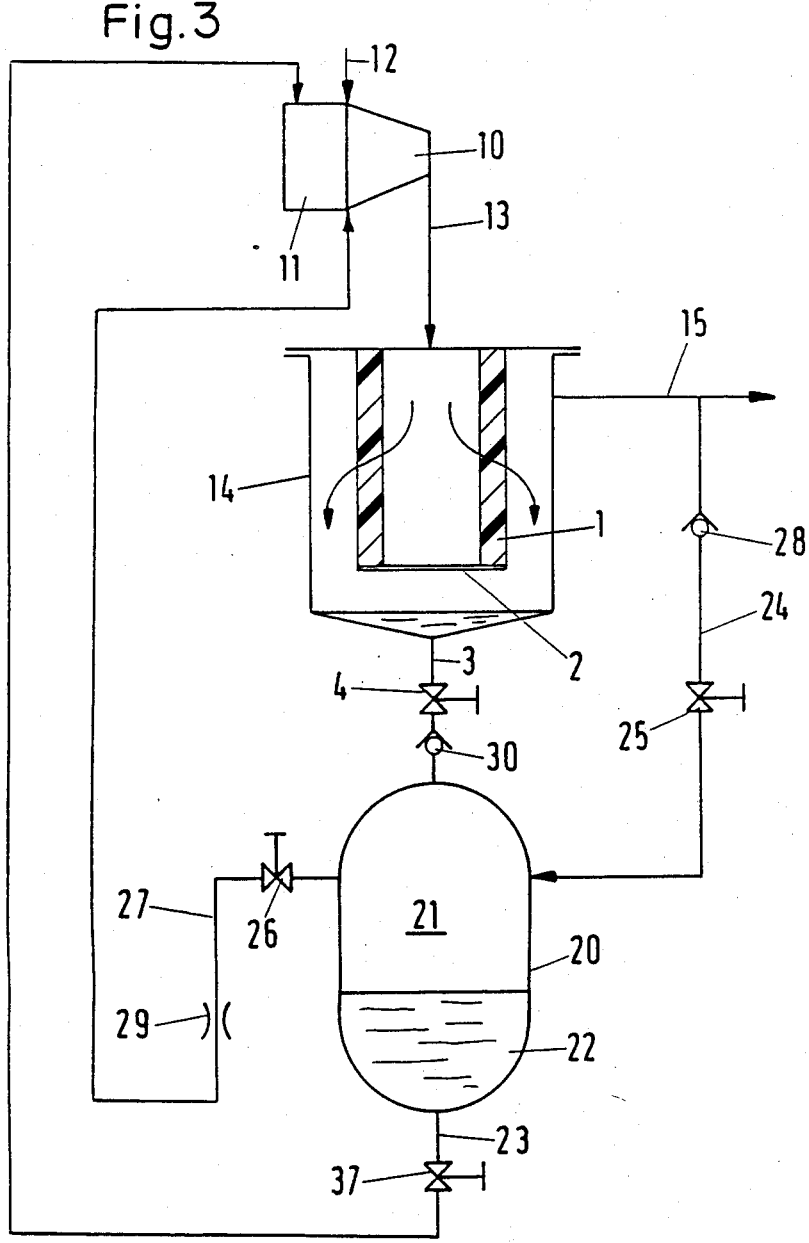

These and other objects and advantages of the invention will become more apparent from the following detailed description taken in conjunction with the accompanying drawings wherein:

FIG. 1 diagrammatically illustrates an apparatus constructed in accordance with the invention;

FIG. 2 illustrates a modified apparatus having a plurality of separators for separating oil from a compressed air flow in accordance with the invention; and FIG. 3 illustrates a modified apparatus in accordance with the invention wherein the gas outlet of the separator is connected to a compressor.

Referring to FIG. 1, the apparatus for removing oil from a compressed gas flow is disposed downstream of a compressor 10 in which a gas flow is compressed. As indicated, the compressor 10 has a crank drive mechanism 11 which reciprocates a piston (not shown) by means of which gas taken in through an inlet line 12 is compressed and exhausted through a delivery line 13. The separating apparatus is connected downstream of the delivery line 13 and includes a separator 14 and a vessel 20 below the separator 14.

As indicated, the separator 14 has an inlet to receive the flow of compressed gas from the line 13 and means, such as a cylindrical microfiber filter 1, for separating oil from the compressed gas flow. As indicated, the filter 1 is closed by a plate 2 at the bottom end and is disposed in the separator 14 coaxially of the gas inlet. The compressed gas flowing downwardly into the filter 1 therefore flows through the filter transversely to the entry direction and, as the gas flows through the filter 1, the oil present in the gas is retained.

The separator 14 also has a gas outlet for expelling a flow of oil-free gas into a delivery line 15 which extends to a load (not shown) for the compressed gas.

The separated oil collects in known manner in a bottom funnel-shaped part of the separator 14 which contains an outlet for expelling a flow of separated oil into a discharge line 3. As indicated, the discharge line 3 is connected to the lowest part of the separator 14 and contains a shut off valve 4 which can be opened from time-to-time. The oil discharge line 3 serves as a connecting line for connecting the oil outlet of the separator 14 to an oil inlet of the vessel 20.

The vessel 20 is operative so that the upper part serves as a gas chamber 21 while the bottom part serves as an oil-collecting chamber 22. In addition, the vessel 20 has a gas inlet selectively connected via a line 24 to the delivery line 15 and, thus, to the gas outlet of the separator 14. As indicated, the line 24 which functions as a connecting line contains a shut off valve 25 as well as a check valve 28 upstream of the valve 25 which closes toward the delivery line 15 so as to prevent a backflow of gas from the vessel 20 to the separator 14. A similar check valve 30 is also disposed in the connecting line 3 between the vessel 20 and the valve 4 in order to prevent a backflow from the vessel 20 to the separator 14.

The vessel 20 also has a gas outlet communicating the gas collecting chamber 21 with a line 27 for expelling gas. The line 27 also contains a shutoff valve 26 and a restrictor 29. The line 27 also communicates with a place such as ambient atmosphere which is at a lower pressure than the gas collecting chamber 21 of the vessel 20.

The vessel 20 also has an oil outlet at the lowest part of the vessel 20 for selectively discharging oil therefrom. As indicated, the outlet communicates with a discharge line 23 which extends to an oil sump 34 and which contains a shutoff valve 37.

During normal operation of the compressor 10, the shutoff valve 4 in the oil discharge line 3 of the compressor 14 is in a closed state; however, the shut-off valves 25, 26 are open while the shutoff valve 37 in the oil discharge line 23 of the vessel 20 is closed. Since the valves 25, 26 are open, a small quantity of gas flows continuously through the vessel 20. This quantity depends upon the size of the crosssection to which the restrictor 29 is set. The pressure in the gas chamber 21 of the vessel 20 is slightly below the pressure at the gas outlet of the separator 14.

Should the pressure in the vessel 20 increase temporarily because of pressure variations in the delivery line 15, the check valve 28 in the line 25 prevents any backflow of gas to the delivery line 15.

When the collected oil in the separator 14 is to be discharged, the shut off valve 25 in the connecting line 24 is closed and the shutoff valve 4 in the oil discharge line 3 is opened. The oil in the separator 14 then discharges by gravity into the vessel 20. The discharge of the oil is boosted by the pressure difference between the gas in the separator 14 and the gas in the vessel 20. After the oil has discharged from the separator 14, the shutoff valve 4 is closed and the shutoff valve 25 in the connecting line 24 is opened so that normal operation can be resumed.

Depending upon the size of the vessel 20, the discharge of oil from the separator 14 can occur a number of times before the oil need be discharged from the oil chamber 22 of the vessel 20. In order to discharge the oil, the shutoff valve 4 remains closed and the shutoff valve 25 is closed. The vessel 20 is therefore completely cutoff from the separator 14 and the delivery line 15. The shutoff valve 37 is then opened so that oil can be discharged through the discharge line 23 with the pressure in the gas chamber 21 ejecting the oil rapidly from the oil collecting chamber 22. Since the vessel 20 has been isolated, any oil/gas aerosol which forms does not harm the gas flowing in the delivery line 15 even after the shutoff valve 37 has been closed and the shutoff valve 25 is reopened since the pressure in the vessel 20 stays lower than the pressure in the delivery line 15.

If the cleanliness requirements for the gas flowing in the delivery line are not excessively stringent, the shutoff valve 25 may remain open both during the discharge of oil from the separator 14 and also during the discharge of oil from the vessel 20. In this case, for the whole time that the respective valve 4, 37 is opened, a very reduced pressure difference expels the oil from the separator 14 and a maximum pressure difference expels the oil from the vessel 20.

Referring to FIG. 2, wherein like reference characters indicate like parts as above, the apparatus for separating oil from a compressed gas flow may employ three separators 44, 54, 64. As indicated, the three separators 44, 54, 64 are connected in series on the gas side, the first separator 44 to be flowed through by the compressed gas having a gas outlet connected to the gas inlet of the second separator 54 to be flowed through and so on. Oil discharge lines 43, 53, 63 of the separators are combined into a common line 40 which, like the oil discharge line 3 of the embodiment of FIG. 1, extends into the gas chamber 21 of the vessel 20.

When the system shown in FIG. 2 is in operation, pressures p1, p2, p3 and p4 arise in the three separators 44, 54, 64 and vessel 20 respectively and the relationship between such pressures is:

$$p1 > p2 > p3 > p4.$$

The maximum pressure difference $\Delta p = p1 - p4$ is small in relation to p1:

$$\frac{\Delta p}{p1} = 1 - \frac{p4}{p1}$$

The effect of the embodiment of FIG. 2 is that there is no disturbance of gas velocity in the separator 44 or 54 or 64 when the shutoff valve 42, 52, 62 in the respective oil discharge line 43, 53, 63 is opened. In this example only one of the shutoff valves 42, 52, 62 should be opened at a time. For the rest, the apparatus shown in FIG. 2 operates in the same way as the apparatus described with reference to FIG. 1.

The restrictor 29 can be a capillary tube or an appropriate throttle valve or a series of diaphragms. The important consideration is that the continuously flowed-through restricting cross-section maintains a reduced pressure difference between the separator 14 and the vessel 20.

Referring to FIG. 3, wherein like reference characters indicate light parts as above. The oil discharge line 23 can return to the compressor drive mechanism 11 instead of a sump whereas the line 27 can be returned to the compressor intake line 12. The latter is particularly recommend in cases in which the gas is of the kind that is expensive or toxic and/or hostile to the environment.

The vessel is not limited to separators fitted with a fiber filter. Appliances, such as baffle plate separators, cyclone separators and Raschig ring separators can be used in combination with the vessel.

The operations described of the various shutoff valves can be performed automatically, instead of manually, through the use of appropriate control facilities. Also, safety monitoring of the pressure difference between, on the one hand, the separators 14, 44, 54 and 64 and, on the other hand, the vessel 20 can be provided. This monitoring would prevent opening of the shutoff valve 4, 42, 52, 62 in the event the shutoff valve 37 is still open or he restrictor 29 maladjusted or of a leakage occurs in the vessel 20 and/or any of the separators.

If the height difference between, on the one hand, the separators 14, 44, 54, 64 and, on the other hand, the vessel 20 is sufficient, the line 27 can be omitted and the restrictor 29 connected directly to the vessel 20.

The apparatus can be used to separate and discharge not just oil but other liquids present in the compressed gas.

The invention thus provides an apparatus for removing oil from a compressed gas flow which is of economic construction and which permits a clean gas to be obtained. Further, the apparatus positively prevents the return of separated oil to a cleaned gas during the discharge of oil from the apparatus.

What is claimed is:

1. An apparatus for removing oil from a compressed gas flow comprising
    at least one separator having an inlet to receive a flow of compressed gas, means for separating oil from the compressed gas flow, a gas outlet for expelling a flow of gas and an oil outlet for expelling a flow of separated oil; and
    a vessel below said separator having an oil inlet selectively connected to said oil outlet of said separator to receive a flow of oil therefrom, a gas inlet selectively connected to said gas outlet of said separator, a gas outlet for expelling gas, a restrictor connected to said gas outlet of said vessel, and an oil outlet for selectively discharging oil therefrom.

2. An apparatus as set forth in claim 1 which further comprises a first connecting line between said oil outlet of said separator and said oil inlet of said vessel, a shut-off valve in said line, a check valve in said line to prevent a back-flow from said vessel to said separator; a second connecting line between said gas outlet of said separator and said gas inlet of said vessel, a shut-off valve in said second line and a check valve in said second line to prevent a back-flow from said vessel to said separator.

3. An apparatus as set forth in claim 1 which further comprises a shut-off valve connected with said gas outlet of said vessel.

4. An apparatus as set forth in claim 1 wherein said restrictor is a capillary tube.

5. An apparatus as set forth in claim 1 which further comprise a compressor connected to said inlet of said separator for delivering a flow of compressed gas thereto, said compressor having a drive mechanism in communication with said oil outlet of said vessel.

6. An apparatus as set forth in claim 1 further comprising a gas line extending from said vessel to an intake side of said compressor for delivering gas thereto.

* * * * *